United States Patent
Davis et al.

(10) Patent No.: US 10,258,878 B2
(45) Date of Patent: *Apr. 16, 2019

(54) APPARATUS FOR DETECTING INPUTS WITH PROJECTED DISPLAYS

(71) Applicant: MEP Tech, Inc., Salt Lake City, UT (US)

(72) Inventors: Mark L. Davis, Hilldale, UT (US); John M. Black, Colorado City, AZ (US); Roger H. Hoole, Salt Lake City, UT (US); Jeffrey Taylor, Naperville, IL (US); Kirby Bisline, Cottonwood Heights, UT (US)

(73) Assignee: MEP Tech, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,605

(22) Filed: Aug. 22, 2017

(65) Prior Publication Data

US 2017/0368453 A1    Dec. 28, 2017

Related U.S. Application Data

(63) Continuation of application No. 13/525,018, filed on Jun. 15, 2012, now Pat. No. 9,737,798, which is a continuation of application No. 12/651,947, filed on Jan. 4, 2010, now abandoned.

(51) Int. Cl.
*A63F 13/00* (2014.01)
*A63F 13/24* (2014.01)
*A63F 13/213* (2014.01)
*A63F 9/24* (2006.01)
(Continued)

(52) U.S. Cl.
CPC ............. *A63F 13/24* (2014.09); *A63F 9/24* (2013.01); *A63F 13/213* (2014.09); *A63F 1/00* (2013.01); *A63F 9/04* (2013.01); *A63F 2001/008* (2013.01); *A63F 2009/241* (2013.01); *A63F 2009/2425* (2013.01);
(Continued)

(58) Field of Classification Search
CPC .......... A63F 13/00; A63F 13/06; A63F 13/08; A63F 2009/2435; A63F 2009/2436; A63F 2009/2442; A63F 2009/2401; A63F 2009/243; A63F 2300/10; A63F 2300/1087; A63F 9/04; A63F 9/24; A63F 2001/008; A63F 1/00
USPC .............................................. 463/1, 7, 22, 31
See application file for complete search history.

(56) References Cited

U.S. PATENT DOCUMENTS 5,844,985 A * 12/1998 Kulberg ................... H01Q 1/18
379/433.05
5,853,327 A * 12/1998 Gilboa ................ A63F 3/00643
273/237
(Continued)

*Primary Examiner* — Michael Cuff
(74) *Attorney, Agent, or Firm* — Durham Jones & Pinegar, P.C., Intellectual Property Law Group

(57) ABSTRACT

An apparatus for detecting user interaction or another input with a projected display includes a boundary definition mechanism and a scanning mechanism. The boundary definition mechanism is capable of defining at least one input region. The scanning mechanism is capable of scanning the at least one input region for any objects therein. An input identification mechanism may identify the input identified by the object, movement of the object, or a change in the object's position. That information may be used to alter the projected display.

20 Claims, 14 Drawing Sheets

(51) Int. Cl.
*A63F 1/00* (2006.01)
*A63F 9/04* (2006.01)

(52) U.S. Cl.
CPC ............... *A63F 2009/2488* (2013.01); *A63F 2300/1093* (2013.01); *A63F 2300/6045* (2013.01)

(56) References Cited

U.S. PATENT DOCUMENTS

| | | | | |
|---|---|---|---|---|
| 6,331,145 B1* | 12/2001 | Sity | ...................... | A63F 9/0468 273/138.2 |
| 6,728,582 B1* | 4/2004 | Wallack | ........... | G05B 19/41875 382/153 |
| 6,832,954 B2* | 12/2004 | Odake | ..................... | A63F 13/04 463/36 |
| 7,095,033 B2* | 8/2006 | Sorge | .................. | A63F 3/00006 250/271 |
| 7,204,428 B2* | 4/2007 | Wilson | ............. | G06K 19/06009 235/462.1 |
| 7,397,464 B1* | 7/2008 | Robbins | ................ | G06F 3/0425 345/156 |
| 7,450,086 B2* | 11/2008 | Thielman | ............. | G03B 21/132 345/32 |
| 7,634,128 B2* | 12/2009 | Snow | ................... | G01B 11/245 356/401 |
| 7,753,798 B2* | 7/2010 | Soltys | ................. | G07F 17/3293 273/149 P |
| 7,961,934 B2* | 6/2011 | Thrun | ................... | G01B 21/20 382/107 |
| 8,134,717 B2* | 3/2012 | Pangrazio | ............. | G01B 11/00 356/614 |
| 8,425,325 B2* | 4/2013 | Hope | ................ | G06F 17/30056 463/29 |
| 8,442,304 B2* | 5/2013 | Marrion | ............... | G06K 9/6211 382/154 |
| 8,672,755 B2* | 3/2014 | Guthrie | ............. | A63B 24/0021 463/31 |
| 8,784,206 B1* | 7/2014 | Gronkowski | ....... | G07F 17/3206 463/32 |
| 2004/0102247 A1* | 5/2004 | Smoot | ..................... | A63F 13/00 463/36 |
| 2004/0160000 A1* | 8/2004 | Lindsey | ..................... | A63F 9/04 273/146 |
| 2005/0162381 A1* | 7/2005 | Bell | ........................ | G06F 3/011 345/156 |
| 2005/0192094 A1* | 9/2005 | Okada | .................. | A63F 13/00 463/34 |
| 2005/0245302 A1* | 11/2005 | Bathiche | ................ | A63F 13/00 463/1 |
| 2006/0052163 A1* | 3/2006 | Aida | ...................... | A63F 13/08 463/31 |
| 2006/0052885 A1* | 3/2006 | Kong | ................... | G06F 1/1626 700/84 |
| 2006/0073869 A1* | 4/2006 | LeMay | .................. | G07F 17/32 463/16 |
| 2006/0073891 A1* | 4/2006 | Holt | ....................... | A63F 13/02 463/30 |
| 2006/0073892 A1* | 4/2006 | Watanabe | ............... | A63F 13/10 463/34 |
| 2007/0046625 A1* | 3/2007 | Yee | ....................... | G06F 3/0416 345/156 |
| 2007/0178955 A1* | 8/2007 | Mills | ........................ | A63F 1/00 463/13 |
| 2007/0201863 A1* | 8/2007 | Wilson | ................... | G03B 29/00 396/429 |
| 2008/0032808 A1* | 2/2008 | Ochi | ....................... | A63D 5/00 473/106 |
| 2008/0122805 A1* | 5/2008 | Smith | ..................... | A63F 13/06 345/175 |
| 2008/0217851 A1* | 9/2008 | Colton | ................. | A63F 3/00157 273/274 |
| 2008/0278894 A1* | 11/2008 | Chen | ..................... | G06F 1/1632 361/679.01 |
| 2008/0280682 A1* | 11/2008 | Brunner | .................. | G07F 17/32 463/40 |
| 2008/0318550 A1* | 12/2008 | DeAtley | ................. | H04L 63/08 455/411 |
| 2009/0020947 A1* | 1/2009 | Albers | ...................... | A63F 9/06 273/157 R |
| 2009/0029754 A1* | 1/2009 | Slocum | .............. | A63B 24/0087 463/5 |
| 2009/0104976 A1* | 4/2009 | Ouwerkerk | ........... | A63F 9/0468 463/22 |
| 2009/0124382 A1* | 5/2009 | Lachance | ................ | A63F 13/00 463/34 |
| 2009/0264196 A1* | 10/2009 | Fujimoto | ................ | G07F 17/32 463/31 |
| 2009/0323029 A1* | 12/2009 | Chen | ..................... | G03B 21/14 353/37 |
| 2010/0020026 A1* | 1/2010 | Benko | ..................... | G06F 3/041 345/173 |
| 2010/0035684 A1* | 2/2010 | Kotlarik | ............... | A63H 17/395 463/31 |
| 2010/0113148 A1* | 5/2010 | Haltovsky | ............. | G06F 1/1626 463/30 |
| 2010/0182402 A1* | 7/2010 | Nakajima | ............. | G09G 5/006 348/42 |
| 2010/0203965 A1* | 8/2010 | Juds | .................... | A63F 3/00157 463/31 |
| 2010/0241976 A1* | 9/2010 | Nozaki | ................ | G06F 3/0482 715/764 |
| 2010/0279768 A1* | 11/2010 | Huang | .................. | A63F 13/216 463/31 |
| 2010/0285881 A1* | 11/2010 | Bilow | ....................... | A63F 9/24 463/37 |
| 2011/0007140 A1* | 1/2011 | Nakahata | ................ | G09G 3/003 348/56 |
| 2011/0111833 A1* | 5/2011 | Nordahl | ................ | A63F 9/0406 463/22 |
| 2011/0133934 A1* | 6/2011 | Tan | ........................ | G06F 1/163 340/573.1 |
| 2011/0165923 A1* | 7/2011 | Davis | ...................... | A63F 9/24 463/1 |
| 2011/0256927 A1* | 10/2011 | Davis | .................... | A63F 9/0468 463/34 |
| 2012/0223885 A1* | 9/2012 | Perez | ..................... | G06F 3/011 345/158 |
| 2013/0113975 A1* | 5/2013 | Gabris | .................. | G03B 17/54 348/333.1 |

* cited by examiner

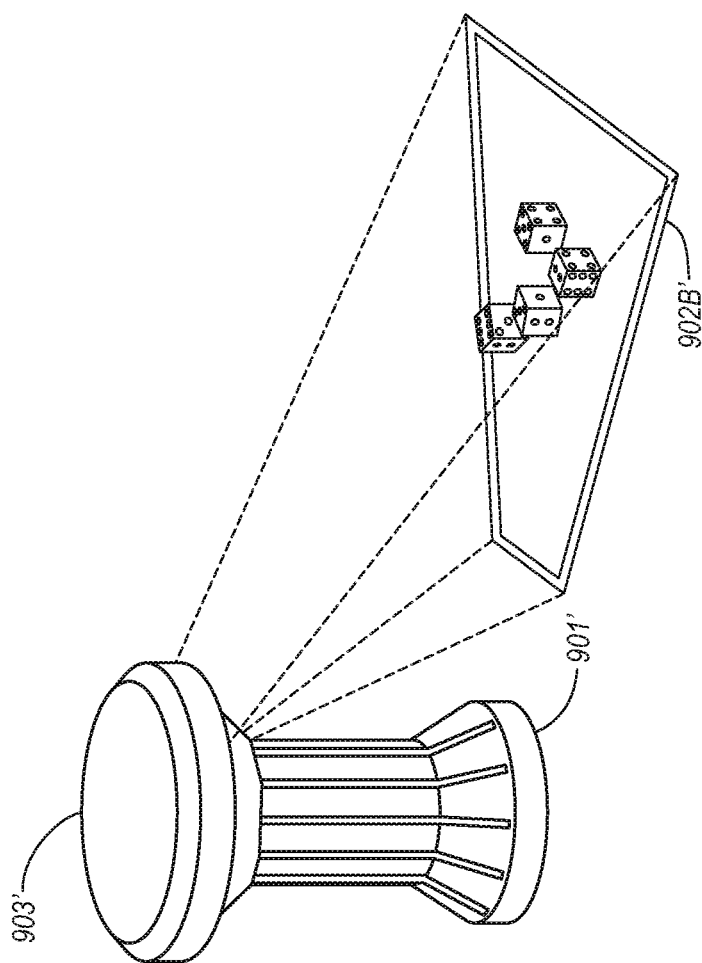

APPARATUS FOR DETECTING INPUTS WITH PROJECTED DISPLAYS

CROSS-REFERENCE TO RELATED APPLICATIONS

This application is a continuation of U.S. patent application Ser. No. 13/525,018, filed on Jun. 15, 2012 and titled ELECTRONIC CIRCLE GAME SYSTEM ("the '018 application"), now U.S. Pat. No. 9,737,798, issued Aug. 22, 2017. The '018 application is a continuation of U.S. patent application Ser. No. 12/651,947, filed Jan. 4, 2010 and titled ELECTRONIC CIRCLE GAME SYSTEM, abandoned ("the '947 application"). The entire disclosures of the '947 application and the '018 application are hereby incorporated herein.

TECHNICAL FIELD

This application relates generally to apparatuses for detecting user interaction and other inputs with projected displays and, more specifically, to apparatuses that define boundaries of one or more input regions and scan the one or more input regions to detect any objects that have been placed on or adjacent to the one or more input regions.

BACKGROUND

Games have provided a social context in which people can interact and have fun. One type of game that is particularly engaging socially are "circle" games, where players will gather around a central horizontal play area that is visible to all players, and interact with the central horizontal play area and with each other. Such players are often as few as two (as is the case with chess or checkers), but may be as many as a dozen or more. Board games are circle games in which the board serves as the central horizontal play area. However, there are other circle games that have a central play area that is not a board. For instance, many card games can be played directly on the surface of a table or other flat surface. Many circle games involve the players manipulating objects on or proximate the play area. For example, many circle games require the player to role dice, start a timer, spin a spinner, play cards, move pieces, and so forth, depending on the game. Many circle games also involve the user maintaining a private area that is viewable to only the player (and perhaps fellow team members).

Circle games have existed for thousands of years across diverse cultures. New circle games arise to meet the social needs and interests of the community, while old circle games go out of use as society loses interest. Many believe that circle games provide a significantly greater opportunity for social development than other types of conventional video games that are gaining in popularity. The contribution of circle games to society should not be ignored, but often is.

Circle games can provide an impetus for bringing families, friends, and other significant social groups together and fostering important human relationships. Children wait with great eagerness to engage with others in circle games. The types of circle games that individuals enjoy may change as one grows older and may differ between population segments. Nevertheless, circle games draw people together with the immediate hope of engaging others in a test of skill, while the horizontal play area provides a subtle and significant side-benefit in permitting channels of communication to be opened, as players are positioned to face each other. Many have experienced that the conversation migrates to topics beyond the scope of the game itself, often resulting in a level of conversation that is greater than particular individuals might be inclined to engage in without the circle game. The benefit to society in encouraging individuals to come together in circle games is often underestimated and not fully recognized in a society in which people choose more and more to absorb themselves in virtual worlds.

BRIEF SUMMARY

Embodiments described herein relate to a game input mechanism. The game input mechanism includes a light-emitting mechanism that defines multiple input regions for a game in which there are multiple players. Each of the input regions is a portion of the playing surface in which a corresponding player subset is to provide physical input (such as rolling dice, playing cards, placing game pieces, and so forth) to affect game state. A scanning mechanism scans objects placed within the input regions, while a communication mechanism communicates information regarding the scanned object. The information might, for example, be communicated to affect an electronic game state maintained in another device or distributed across multiple devices.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 10B illustrates the scanning game input device of FIG. 10A, after having rotated the scanning mechanism to capture physical game input from another game input region;

DETAILED DESCRIPTION

The principles described herein relate to a game input mechanism that includes a light-emitting mechanism that defines multiple input regions for a game in which there are multiple players. Each of the input regions is a portion of the playing surface in which a corresponding player subset is to provide physical input (such as rolling dice, playing cards, or placing game pieces, and so forth) to affect game state. A scanning mechanism scans objects placed within the input regions, while a communication mechanism communicates information regarding the scanned object. The information might, for example, be communicated to affect an electronic game state maintained in another device or distributed across multiple devices.

Although not required, the game input mechanism may be especially useful in an electronic game system that will be described with respect to FIGS. 1 through 7. After the electronic game system is described in detail, embodiments of the scanning game input mechanism will be described with respect to FIGS. 8, 9, 10A and 10B, and 12 through 14. Finally, a computing system that may serve within the various components of the electronic game system and/or the game input mechanisms will be described with respect to FIG. 11. Accordingly, this description will now begin with the electronic game system.

Figure 1:
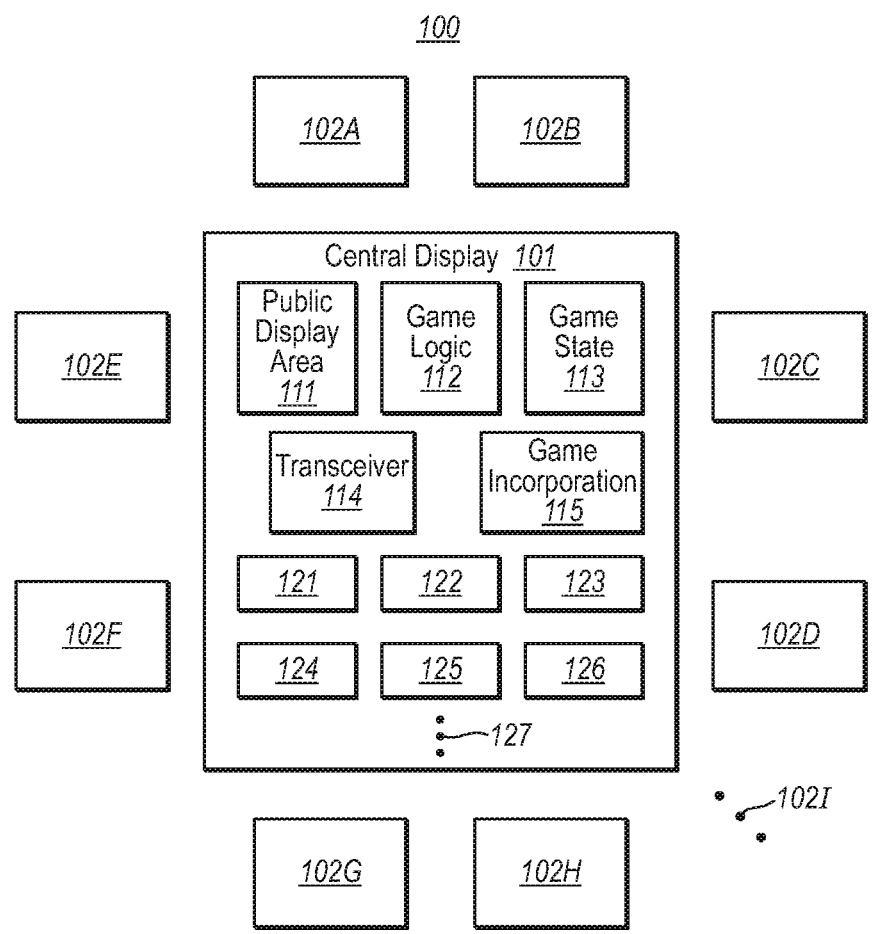
FIG. 1 abstractly illustrates a distributed electronic game system

FIG. 1 abstractly illustrates a distributed electronic game system 100, which may also be referred to herein as a "system 100" for the sake of simplicity. The system 100 includes a flat multi-touch functional central display 101. The central display 101 may be laid horizontally on a table or other surface and may be used as a horizontal central playing surface. For instance, the central display 101 may behave as an electronic board of a digital board game. The central display 101 may be moveable or may be fixed, perhaps being built into a furniture item. Since FIG. 1 is abstract, the various components illustrated as being included within the central display 101 should not be construed as implying any particular shape, orientation, positioning, or size of the corresponding component. Subsequent figures will illustrate a more concrete representation of an example of the central display 101.

The system 100 also includes surrounding game control devices (also called herein "game input device"). There are eight such game input devices 102A through 102H illustrated in FIG. 1, although the ellipses 102I represents that there may be less than or greater than eight game control devices. The surrounding game input devices 102A through 102I may be referred to generally as game control devices 102 or game input devices 102. The game input devices 102 are each represented abstractly as rectangles although they will each have a particular concrete form depending on their function and design. Example forms are described further below. The game input devices 102 may be orientation-sensitive game input devices, player consoles, or a combination thereof.

Although not required, the central display 101 may preferably be a flat multi-touch functional central display 101 that is capable of detecting and responding to multiple simultaneous instances of players touching the central display 101, and affecting game state in response to each touch instance. Such may be employed to effectively assist in games in which multiple players may be touching the screen simultaneously, although not all games require some simultaneous input. The central display 101 may also have a scratch resistant coating to prevent scratching that might otherwise be caused by players touching the central display 101. The central display 101 may also receive signals from the surrounding game input devices 102, interpret control actions from the signals, and affect game state in response to the control actions.

In one embodiment, one, some, or even all of the game input devices 102 are wireless. In the case of a wireless input device, the wireless input device may communicate wirelessly with the central display 101. One or even some of the game input devices 102 may be remotely located from the central display 101. Such remotely located game input device(s) 102 may perhaps communicate with the central display 101 over a Wide Area Network (WAN) such as the Internet. This would enable a player to participate in the game being displayed on the central display 101 even if that player is located on a completely different part of the globe. Thus, for example, a father or mother stationed overseas might play a child's favorite board game with their child before going to bed. Or perhaps former strangers and new friends from different cultures around the globe might engage in a board game, potentially fostering cross-cultural ties while having fun. That said, perhaps all of the game input devices 102 may be local (e.g., in the same room) to the central display 101.

The central display 101 includes a public display area 111. Note that the public display area 111 is only abstractly represented in FIG. 1, and is thus not drawn to scale. In a preferred embodiment, the public display area 111 would actually occupy a substantial majority of the viewable surface of the central display 101 when the central display 101 is laid horizontally, and thus emulate a board-like play area. The public display area 111 displays game information that should be viewable by all of the players and is thus deemed "public." There is no required form for the central display 101. The central display 101 might have any size or configuration.

The central display 101 also includes game logic 112 that is capable of rendering all or at least a portion of the public game state 113 on the public display area 111, and is capable of formulating or determine game state based on game input. A communication mechanism in the form of a wireless transceiver 114 receives control information from surrounding game input devices 102, and in some cases, may transmit information to the surrounding game input devices 102. A game incorporation mechanism 115 identifies the control information received from the game input devices 102 and alters a game state based on the control information.

In one embodiment, the central display 101 incorporates functionality of a general-purpose computing system with a hard drive 121, memory 122, general-purpose processor(s) 123, speakers 124 (and/or headset ports with headsets or earpieces), a video driver 125, a wireless transceiver 126 (such as a BLUETOOTH® transceiver), and so forth (see ellipses 127). In that case, the game logic 112, portions of the wireless transceiver 114 stack, and the game incorporation mechanism 115 may be software-implemented. The public game state 113 may be represented as data within the hard drive 121, memory 122 and/or video driver 125. The wireless transceiver 126 is capable of receiving multiple signals simultaneously.

The central display 101, and/or any of the surrounding game input devices 102 may have built in microphones to allow sound data (such as the player's voice) to be input into the system to affect game configuration or game state. There may also be voice recognition capability incorporated into central display 101 and/or surrounding game input devices 102 to permit such sound data to be converted to more usable form. Speakers, headset ports, and earpieces may also be incorporated into the surrounding game input devices.

Although the system 100 is described as being an electronic game system, the principles described herein are not limited to the use of system 100 for games. For instance, the central display 101 may be used to display any public state, whereas game input devices 102 may not necessarily be used to provide input for a game. The game logic 112 may be any logic. Accordingly, the term "player" described herein may more broadly include any participant in a system in which there is a public viewing area for displaying public state associated with any process, and a private viewing area for displaying private state associated with the process.

Figure 2:
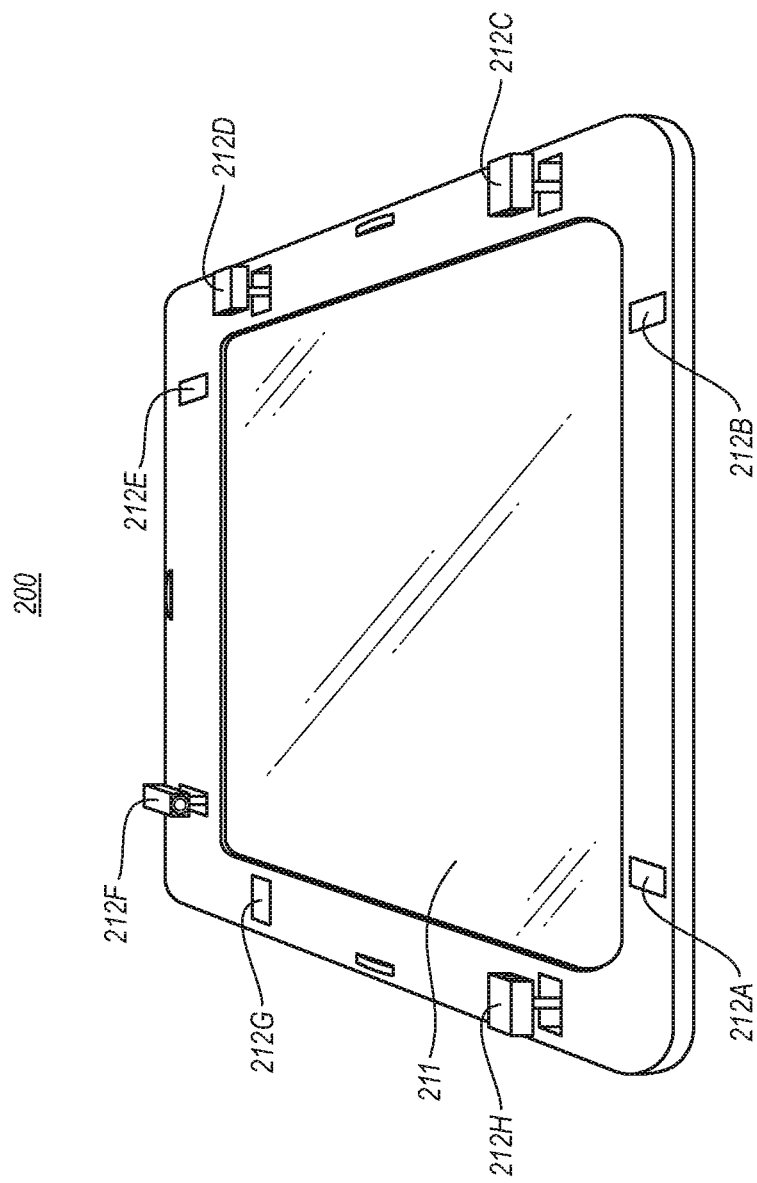
FIG. 2 illustrates a more concrete example of the central display of FIG. 1.

FIG. 2 illustrates a more concrete example 200 of the display 101 of FIG. 1. The display 200 includes the public display area 211 that represents an example of the public display area 111 of FIG. 1. The displayed public game state may be associated with any type of game, and may render game state in response to instructions provided by the video driver 125. In one embodiment, the video driver 125 may, in response to commands from the game logic 112, display cinematic game introductions and/or scene transitions to help entice the players into a richer playing experience. The video driver 125 may also display a cinematic conclusion that may depend on a result of the game.

In the display 200, there are a number of built-in input devices 212A through 212H (referred to collectively as "built-in input devices 212"). In this case, there are eight illustrated built-in input devices 212 (two on each of the four sides of the display 200), although the display 200 may have any number of built-in input devices 212. The built-in input devices 212 may be a camera capable of capturing a still or video image and may be adjustable. Thus, for example, in a game with eight local players, each camera may be adjusted to capture the video of a corresponding player. The display 200 may include logic that renders the captured video, or portions thereof, on the public display area 211 of the display 200. The logic might also cause all or portions of that video to be transmitted to game input devices (such as player consoles) so that the video may also be displayed at the various game input devices. In one embodiment, the built-in input devices 212 may fold into the display 200 edge. For instance, in FIG. 2, the built-in input devices 212A, 212B, 212E and 212G are illustrated in contracted collapsed (inactive) position within the display 200, whereas the input devices 212C, 212D, 212F and 212H are illustrated in extended position ready to capture video.

Alternatively or in addition, the built-in input devices 212 may be a scanner, capable of detecting physical game input provided by a player (such as a roll of the dice, the playing of a card, or the positioning of a game piece. For instance, the scanner may include a light-emitting boundary definition mechanism that defines the boundary of an input region using emitted light. For example, the emitted light may be emitted along the perimeter of the input region and/or across the area of the input region. The player may then visualize where the physical game input is to be provided. Once that input is provided, the scanner scans the physical input so that the game input represented by that physical input may be incorporated into the game by game incorporation mechanism 115. The scanner might be, for example, a three-dimensional image scanner such as those conventionally available on the market. The scanner may be integrated with the camera to form a built-in input device 212, or they may be separate from each other to allow for independent adjustment of the camera direction and input region positioning.

Figure 3:
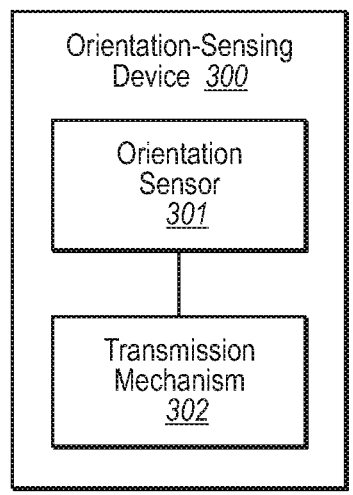
FIG. 3 abstractly illustrates an orientation-sensing game input device that may be an example of a game input device of FIG. 1.

FIG. 3 abstractly illustrates an orientation-sensing game input device 300, which may also be referred to herein as an "input device 300" for the sake of simplicity. As mentioned above, the surrounding game input devices 102 of FIG. 1 may be input devices 300 that sense orientation, player consoles, game master consoles or a combination thereof. FIG. 3 is an example of such an orientation-sensing game input device. Once again, FIG. 3 is abstract. Accordingly, the various components illustrated as being included within the input device 300 should not be construed as implying any particular shape, orientation, positioning or size of the corresponding component. Subsequent figures will illustrate a more concrete representation of an example of the input device 300.

The input device 300 includes an orientation sensor 301 that, when active, outputs a spatial orientation signal representing a spatial orientation of the game input device. The orientation sensor 301 is rigidly attached to the input device 300. The orientation sensor 301 is able to detect how the input device 300 is oriented with respect to vertical, and/or how the game input device is oriented with respect to north. In one embodiment, the orientation sensor 301 is an accelerometer. Alternatively or in addition, the orientation sensor 301 may be a compass that generates a direction signal indicating a geographical orientation. The input device 300 may also potentially have a Global Positioning System (GPS) that allows the input device 300 to detect a global position of the input device 300 in global coordinates.

A transmission mechanism 302 is communicatively coupled to the orientation sensor 301 so as to receive the spatial orientation signal from the orientation sensor 301 and transmit spatial orientation information present in the spatial orientation signal to the flat multi-touch central display 101. In one embodiment, the transmission mechanism 302 may accomplish this using acoustics, but preferably accomplishes this using wireless electro-magnetic radiation. A suitable protocol for transmission of the spatial orientation information is BLUETOOTH®. As an example, if the input device 300 is a multi-sided die, and if the orientation sensor 301 is a tri-axial accelerometer, the spatial orientation signal may indicate or at least include enough information to infer which side of the die is facing up. As another example, if the orientation-sensing device is a playing card or a coin, and if the orientation sensor 301 is a uniaxial accelerometer, the spatial orientation signal may indicate or at least include enough information to infer whether the playing card is face up or face down, or which side of the coin is facing up. As a final example, if the input device 300 is a domino tile, and the orientation sensor 301 is an accelerometer, the spatial orientation signal may convey whether the domino tile were face up or face down. Furthermore, if the orientation sensor 301 is also a compass, the spatial orientation signal may convey which direction the domino was oriented on the table.

The transmission mechanism 302 may also transmit other useful information. For instance, the transmission mechanism 302 may transmit a locally-unique and perhaps globally-unique identifier. This may be especially useful in a case where there are multiple input devices 300 being used in a game. For instance, if the input devices 300 were each six-sided die, the central device could confirm what die was rolled, and the associated rolled value of that specific die, even if multiple dice were rolled.

The input device 300 might also transmit other information identifying characteristics of the input device 300. For instance, if the input device 300 is a coin, the input device 300 might transmit a device-type identifier that identifies the input device 300 as a coin, and so forth for other types of devices. The input device 300 might also transmit information from which the central device might infer other characteristics of the device as well, such as color, size, shape, which might be helpful where such characteristics have an impact on game state.

In one embodiment, the input device 300 might transmit information that helps the central display 101 interpret the impact on the game of the orientation of the input device 300. For instance, one die might have a quality of 36 in which the actual value input by the roll result is to be 36 times the number rolled. Such quality information may be included with the transmission. In one embodiment, the transmission mechanism 302 includes a reliable transmission mechanism 302 in which transmissions are acknowledged by the central display, or else the information is retransmitted according to a particular protocol.

There are many example game input devices that may incorporate orientation-sensing capability with suitable modification in accordance with the broad scope of the principles described herein. Several examples have already been given including a multi-sided die, a playing card, a coin, and a domino tile. Other examples include, but are by no means limited to, the following:

1) a game piece miniature;
2) bottle caps;
3) plastic bone pieces;
4) cans;
5) tokens;
6) blocks;
7) house or hotel pieces;
8) marbles;
9) jewels;
10) treasure chest lid;
11) jelly beans;
12) checker pieces;
13) any type of wood game piece;
14) any type of plastic game piece;
15) any type of metallic game piece;
16) and many more.

The presentation of this list is not intended to provide an exhaustive enumeration of the types of orientation-sensing game input devices that may be used consistent with the principles herein. The principles described herein may be applied in any game input device whose orientation has some impact on a game state. Since the types of games are limitless, and subject only to the limits of the human imagination, the types of orientation-sensing game input devices that may be altered to incorporate the features described herein are likewise limitless.

A specific concrete example of an orientation-sensing game input device will now be described with respect to FIG. 4, which illustrates an orientation-sensing die 400. In the illustrated case, the orientation sensing die 400 is a six-sided die. However, the principles described herein may be applied to any die, regardless of the number of sides. For instance, some die have as few as only four sides. Some commercially available die have as many as 100 sides.

Figure 4:
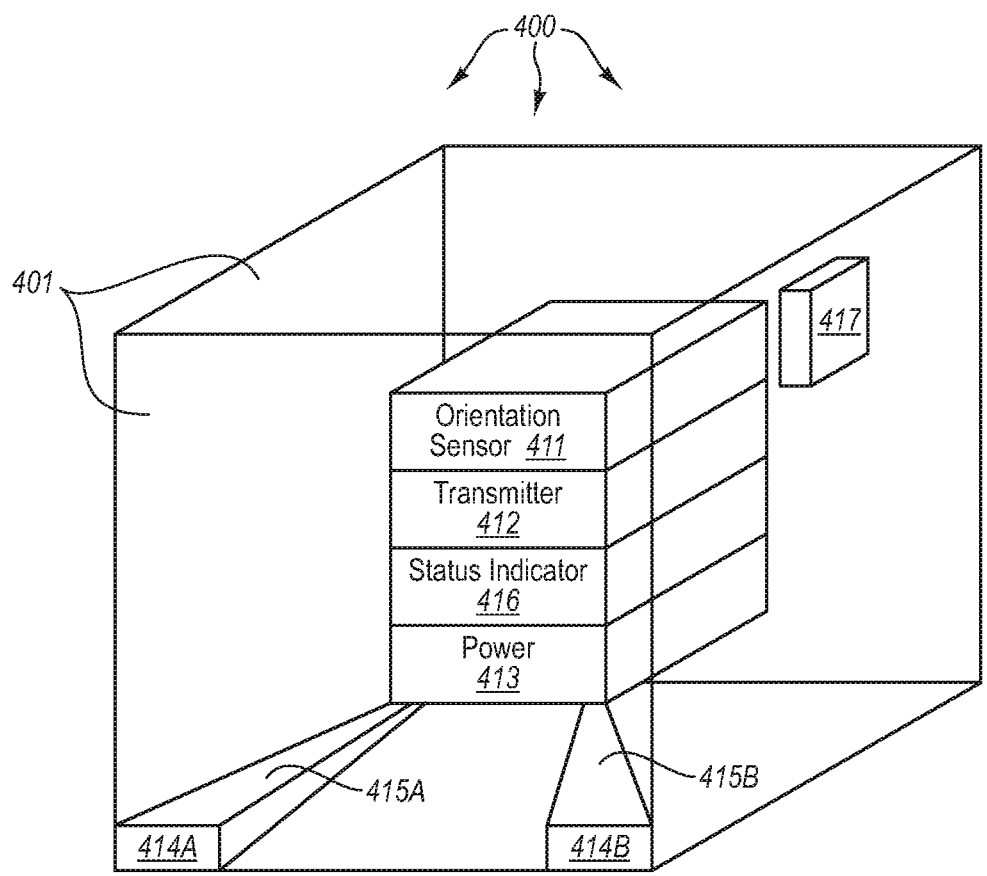
FIG. 4 illustrates a specific concrete example of an orientation-sensing game input device in the form of an orientation-sensing die.

Referring to FIG. 4, the die includes a multi-sided body 401 having at least four flat sides; (in the illustrated example six sides). For clarity, the image on each itself (often, but not always a certain number of distributed dots) is not illustrated such that some of the internal-embedded components may be more easily seen. That said, the various components are not necessarily drawn to size since the precise size and positioning of the components is not critical, so long as the components fit within the boundaries of the die. Furthermore, if the die is desired to be kept random, the components should be distributed appropriately to keep the center of gravity in the middle of the cube.

An orientation sensor 411 (such as a tri-axial accelerometer) is embedded within the multi-sided body 401 and is structured to, when active, output a spatial orientation signal representing a spatial orientation of the game input device 102. A transmission mechanism 412 is also embedded within the multi-sided body 401 and communicatively coupled to the orientation sensor 411 so as to receive the spatial orientation signal and transmit spatial orientation information present in the spatial orientation signal to locations external to the multi-sided body. In one embodiment, the orientation sensor 411 and the transmission mechanism 412 are a single integrated BLUETOOTH®-enabled tri-axial accelerometer.

An electronic power source 413 is also embedded within the multi-sided body 401 and is coupled to the orientation sensor 411 and the transmission mechanism 412 so as to electronically power the orientation sensor 411 and the transmission mechanism 412. In one embodiment, the electronic power source 413 includes a rechargeable battery. There may be a plurality of electrical contacts 414A and 414B accessible from the outside of the multi-sided body 401, each establishing a corresponding electrical path 415A and 415B from the outside of the multi-sided body 401 to the rechargeable battery. The electronic power source 413 may also be an insertable and removable battery and may even perhaps be disposable. In one embodiment, the electronic power source 413 is a non-rechargeable disposable battery that is not removable from the die. In that case, the entire die may be considered disposable, or at least converts to a normal non-transmitting die after the battery fails. In the case of a non-rechargeable battery, there would be no need for the electrical paths 415A and 415B. In the case of a removable battery, the die may have a cavity that fits the battery, and that is accessed by removing a cover that snaps into place.

A status indicator 416 may also be included and may be visible from external to the multi-sided body 401. For instance, the status indicator 416 may be on the surface of the orientation-sensing die 400. If the multi-sided body 401 is composed of translucent material, the status indicator 416 may also be embedded within the multi-sided body 401 itself. If necessary or desired, a counterweight 417 may also be positioned rigidly within the multi-sided body 401 so as to further center a center of gravity of the wireless die.

Figure 5:
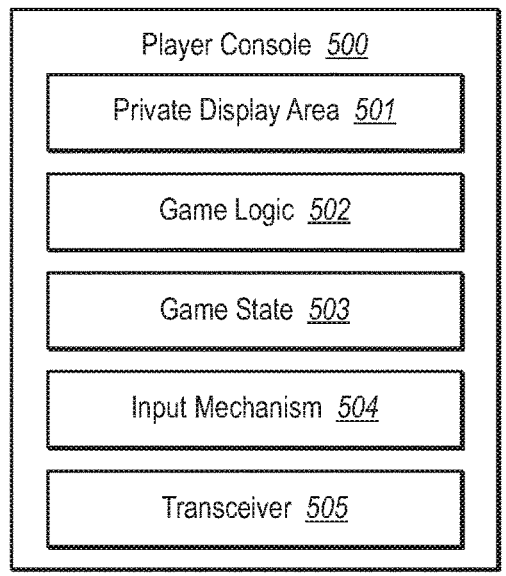
FIG. 5 abstractly illustrates a player console that represents an example of a game input device of FIG. 1.
Figure 6:
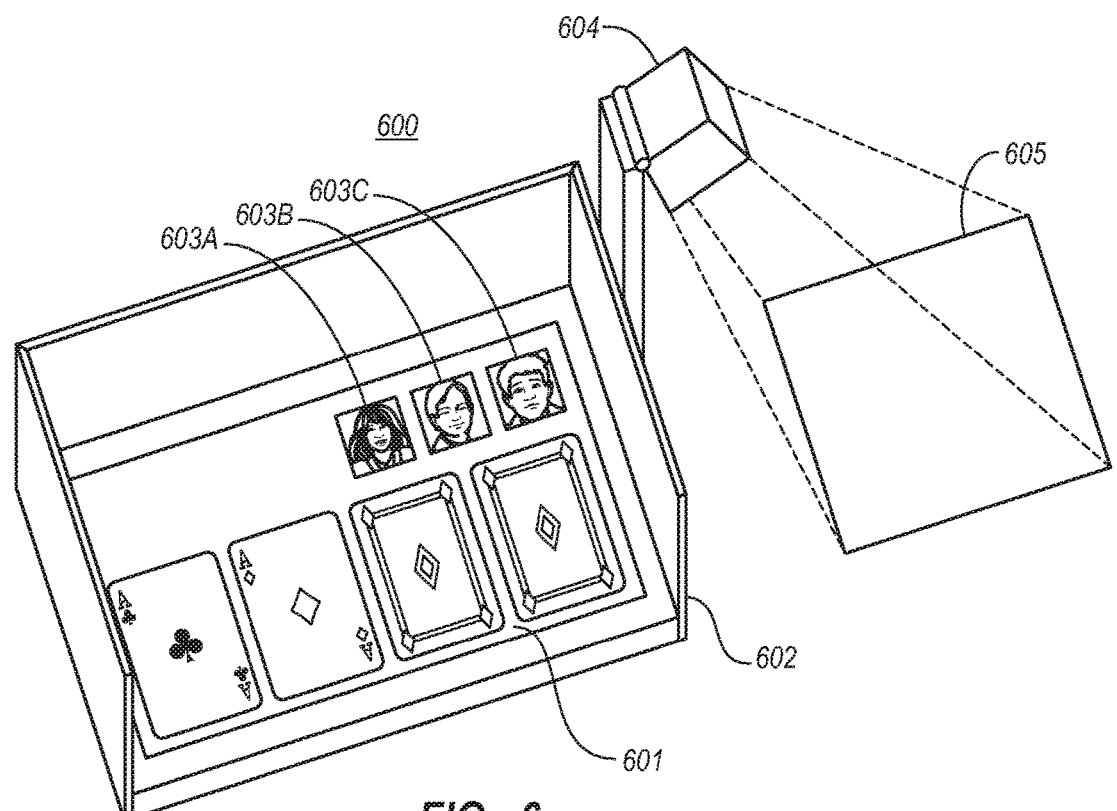
FIG. 6 illustrates a concrete example of a player console.

FIG. 5 abstractly illustrates a player console 500. As previously mentioned, the game input devices 102 of FIG. 1 may be player consoles, orientation-sensing devices, or combinations thereof. FIG. 5 is an abstract illustration of a player console 500 showing functional components of the player console 500. Once again, FIG. 5 is abstract. Accordingly, the various components illustrated as being included within the player console 500 should not be construed as implying any particular shape, orientation, positioning or size of the corresponding component. FIG. 6 will illustrate a more concrete representation of an example of the player console 500.

Each player, or perhaps each player team, may have an associated player console, each associated with the corresponding player or team. The player console 500 includes a private display area 501 and game logic 502 capable of rendering at least a portion of game state 503 associated with the player (or team). The player or team may use an input mechanism 504 to enter control input into the player console 500. A transmission mechanism illustrated in the form of a transceiver 505 transmits that control information to the flat multi-touch functional display 101, where the control information is used to alter the game state at the central display. If the player console 500 is a wireless player console, the transceiver 505 would be a wireless transceiver. The control information may also be used to control the game state at the player console 500, as well as to update the private display area 501 at the player console 500. The transceiver 505 may also wirelessly receive information from the central display 101. The transceiver 505 may even receive wireless information transmitted by surrounding orientation-sensing devices so that the game logic 502 may update the game state 503, and potentially also update what is displayed in the private display area 501. The transceiver 505 is capable of receiving multiple orientation-sensor signals at the same time. Thus, with a single roll of the dice, the game state 503 at the central display 101 as well as one or more player consoles 500 may be updated.

FIG. 6 illustrate a concrete example of a player console 600. Here, the private display area 601 displays the player's private information (in this case, several playing cards). The player console 600 also includes a barrier 602 to prevent other players from seeing the private game state displayed on the private display area 601. The private display area 601 may be touch-sensitive, allowing the player to interact with physical gestures on the private display area 601, thereby causing control information to update the rendering on the private display area 601, and the game states on the player console 600, as well as on the central display 101. The private display area 601 also, in this example, displays video images 603A, 603B and 603C of other players. For instance, such images may have been captured by the built-in input devices 212 (see FIG. 2), causing the central display 200 to transmit the images to the player console.

The player console 600 also may have a built-in input device 604, which may be a camera and/or a 3D scanner as described above for the built-in input devices 212. Specifically, the camera may take a still image or a video image of the player associated with the player console 600. In FIG. 6, as for the scanner, the light-emitting boundary definition mechanism emits light to define an input region 605 (in this case, rectangle shaped), which moves with the player console 600. The player may provide physical input (e.g., the roll of a dice or dice, the playing of a card or cards, the positioning of a game piece or pieces, and so forth). The scanner scans the objects placed in the input region 605. There are a variety of conventional mechanisms for performing 3D scanning to thereby reconstruct a three-dimensional rendering of the surfaces that are visible to the 3D scanner. One mechanism is to have a simple video camera that takes a video image of the visible surfaces while a wide angled laser line is passed over the visible surfaces. Based on the position of the video camera and the laser, and using the video, the 3 dimensional position of the visible surfaces within the scanner range can be extrapolated.

Figure 7:
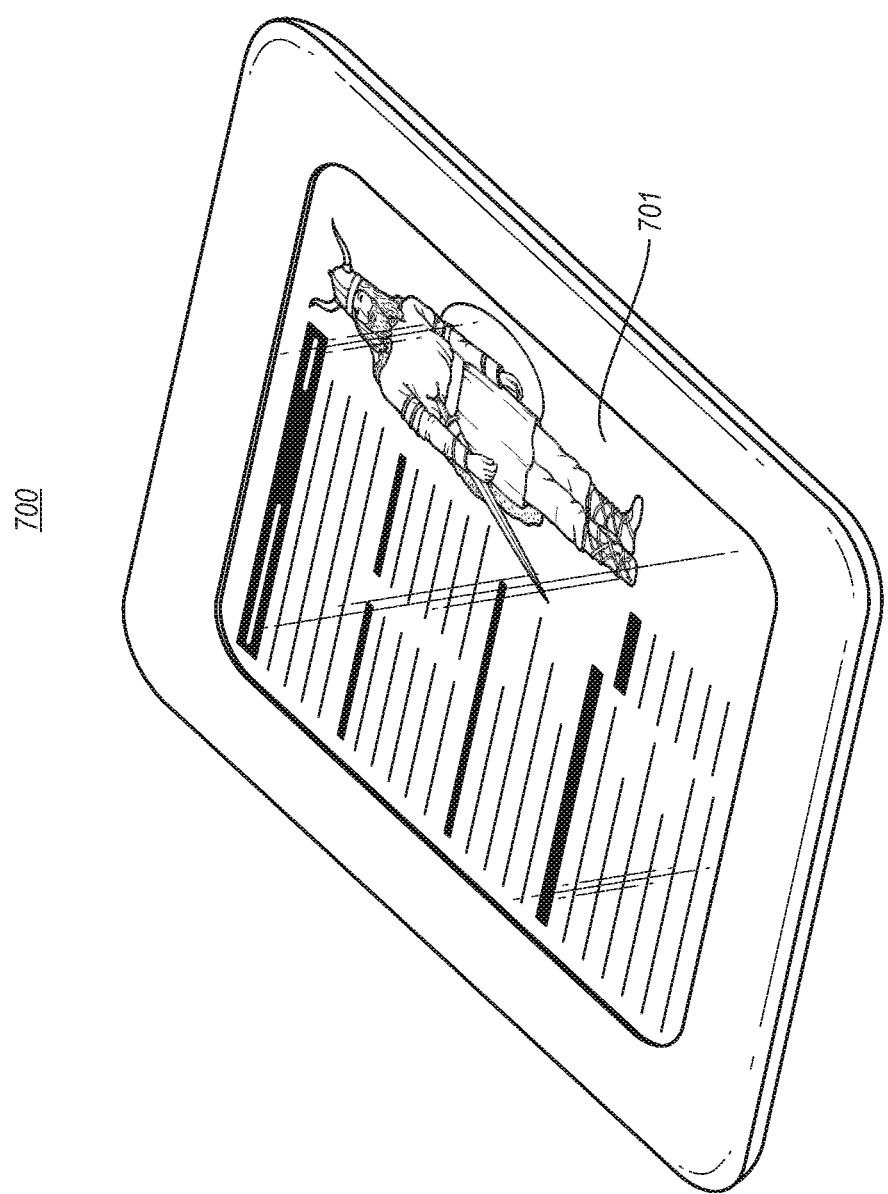
FIG. 7 illustrates another concrete example of a player console in the form of a game master player console.

In one embodiment, at least one of the player consoles is different from the remaining player consoles. FIG. 7 illustrates such a console 700. In this case, the console 700 might be a game master console, in which the game master may interface with the private viewing area to perhaps control game state. For instance, the game master may use physical gestures on the touch-sensitive display 701 of the console 700 to affect what is displayed on the central display 101. For instance, the game master might control what portions of the map are viewable on the central display 101. The game master might also control what effect another player's actions might have on the operation of the game logic, whether at the central display, or whether at one or more of the player consoles. The game master might also create a scenario and setting of a game using the console 700.

Figure 8:
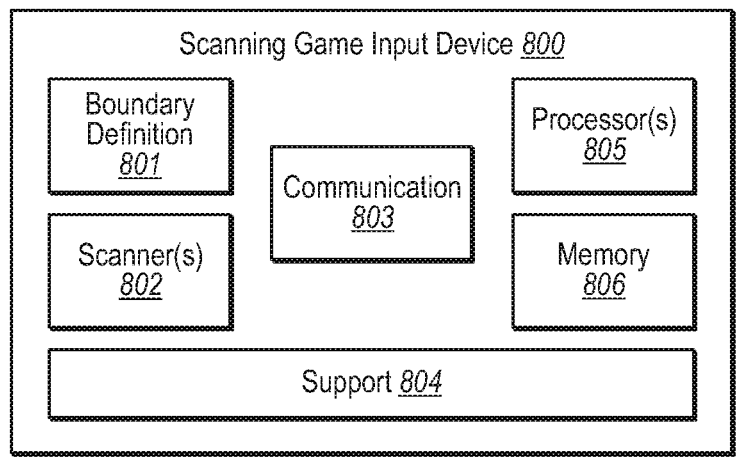
FIG. 8 schematically illustrates components of a scanning game input device.

FIG. 8 illustrates abstractly a game input mechanism in the form of a scanning device 800. The scanning device is an example of the game input devices 102 of FIG. 1. The scanning device 800 is drawn abstractly so once again the various components of the scanning device are not limited to any particular size, position, orientation, or form. The scanning device 800 includes a light-emitting boundary definition mechanism 801, a scanning mechanism 802, a communication mechanism 803, and a mechanical support mechanism 804. The scanning device 800 may also have processor(s) 805 and memory 806, thus enabling the scanning device 800 to at least partially process information captured by the scanning mechanism 802, control the light-emitting boundary definition mechanism 801, and/or communicate with the communication mechanism 803. After a discussion of the function of the various components 801 through 806 of the scanning device 800, various concrete examples will be described with respect to FIGS. 9, 10A and 10B.

The light-emitting boundary definition mechanism 801 defines multiple input regions for a game in which multiple players engage. Each of the so defined input regions is a region on a playing surface in which a corresponding player subset is to provide physical game input. A player subset may be multiple players in a team-oriented game, or may be a single player in a game that does not involve teams. Examples of physical input include 1) the rolling of a die or dice, 2) the playing of one or more cards, 3) the positioning of one of more game pieces, 4) the spinning of a spinning or top, 5) a human hand, and so forth. For instance, in an electronic version of rock, paper, scissors, a human hand might be used to provide game input within the game input region.

In one embodiment, the light-emitting boundary definition mechanism 801 may selectively define only one or perhaps a subset of the multiple regions that the light-emitting boundary definition mechanism 801 is capable of defining. For example, in a turn-oriented game in which it is a turn of one or more, but less than all, of the player subsets, the corresponding game input regions for only those player subset(s) whose turn it is might be made visible. Game state transmitted by the central display 101 and/or the other game input devices 102 might give the scanner game input device information sufficient to derive the identity of whose turn it is, to thereby prompt the scanning device 800 to light the appropriate region corresponding to show whose turn it is, while deemphasizing, or even not lighting at all, the game input region corresponding to player subset(s) whose turn it is not.

A scanning mechanism 802 is configured to scan at least some objects placed within any of the plurality of input regions. As an example, there may be a single scanner that rotates or otherwise moves so as to be able to perform a three-dimensional scan on whichever region physical game input is configured to be captured in. In another embodiment, there might be a specific three-dimensional scanner allotted for each game input region. The corresponding scanner is then operating when physical game input is expected for the corresponding game input region. The game input regions may be non-overlapping or they may be overlapping depending on the design of a game.

A communication mechanism 803 communicates information regarding scanned objects scanned by the scanning mechanism 802. In one embodiment, the scanning device 800 is wireless, in which case the communication mechanism 803 communicates wirelessly with, for example, the central display 101 and/or one or more other game input devices 102. The communication mechanism 803, for example, communicates information regarding scanned objects scanned by the scanning mechanism 802, and information regarding which input region the scanned object was scanned in.

For instance, the communication mechanism 803 might simply send image information (e.g., a collection of images of a die) to the central display 101, and have the central display 101 extrapolate the three-dimensional rendering of the viewable surfaces, and then calculate the game input. Alternatively, the processor(s) 805 might take on more processing role by extrapolating the three-dimensional rendering of the scanned image, and then the communication mechanism 803 communicates that three-dimensional rendering to the central display, which then calculates the game input. As another alternative, the processor(s) 805 might take on all processing required to determine the game input from a scanning operation. For example, the processor(s) 805 might determine that the player subset rolled two die, resulting in a roll of a six and a four. The communication mechanism 803 might also communicate with player consoles to thereby affect the private game state of the private consoles.

The communication mechanism 803 might additionally communicate with other devices such as, for example, a surrounding computing system (such as a laptop computer), to convey information and/or may receive information from the surrounding computing system (such as configuration information) or from the central display 101 or other game input devices 102.

The mechanical support mechanism 804 positions the light-emitting boundary definition mechanism 801 and the scanning mechanism 802 with respect to a playing surface. In one embodiment, the mechanical support mechanism 804 couples the scanning device 800 to the central display 101, or perhaps couples the scanning device 800 to one of the player consoles. Alternatively, the scanning device 800 may not be rigidly coupled to the central display 101 or the player consoles, but may be free standing.

Figure 9:
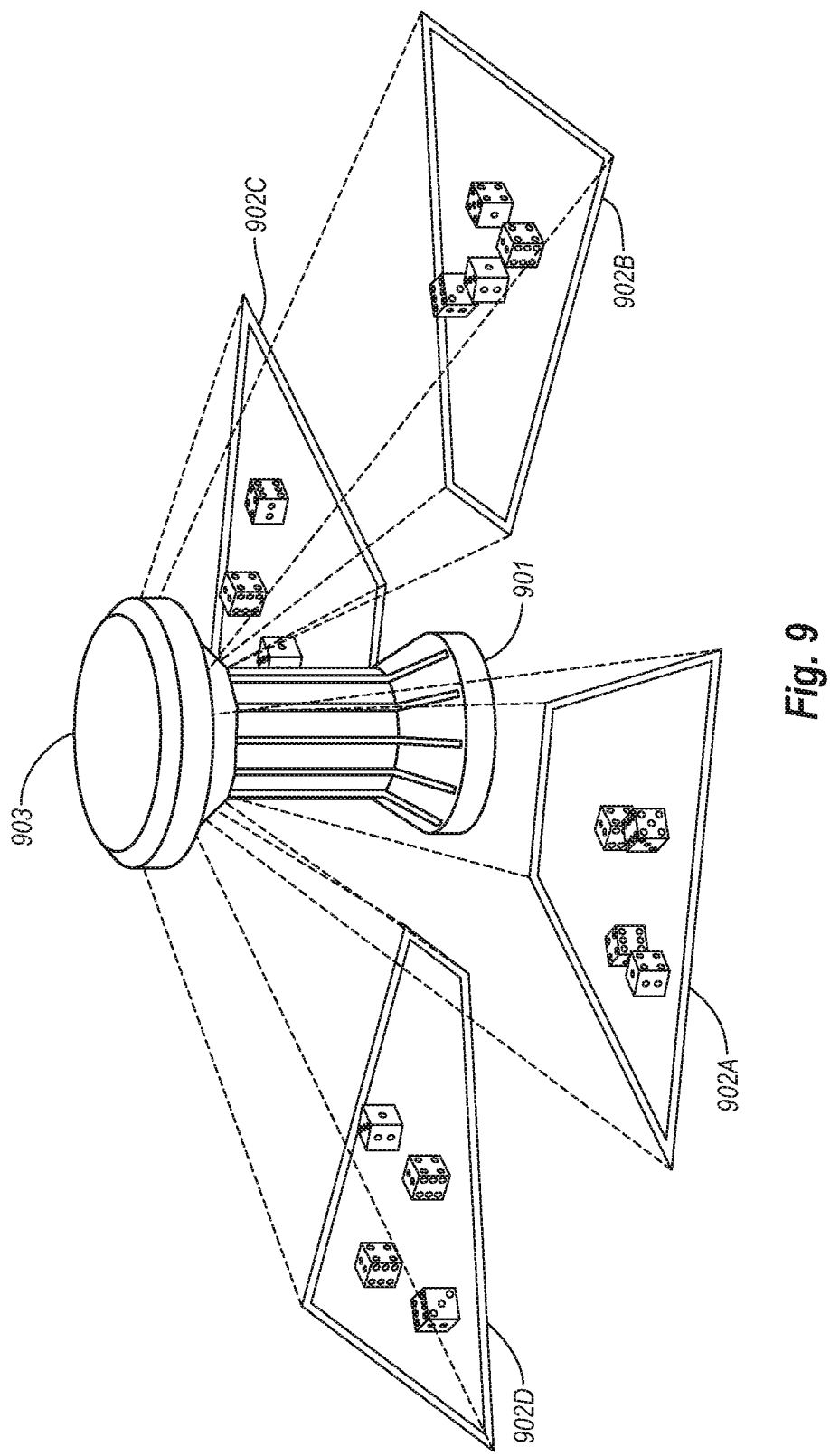
FIG. 9 illustrates one embodiment of the scanning game input device of FIG. 8 in which multiple game input regions are simultaneously defined.
Figure 10A:
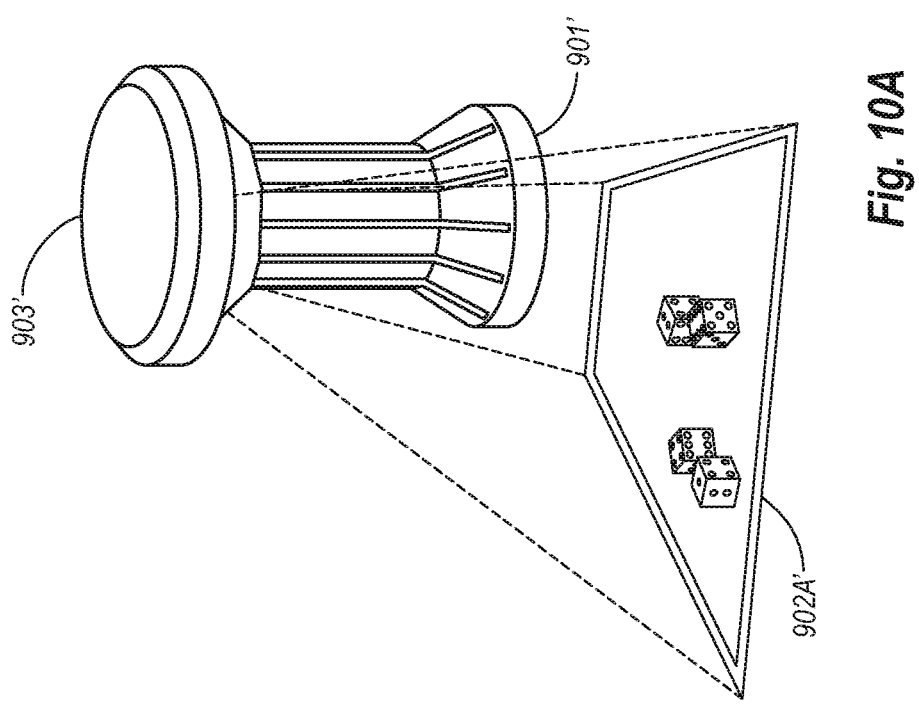
FIG. 10A illustrates another embodiment of the scanning game input device of FIG. 8 in which one game input region at a time is defined according to whose turn it is to provide physical game input.

The mechanical support mechanism 804 may have a different form depending on the configuration of the scanning input system. For instance, if the scanning device 800 scans from below (e.g., which could be done with a translucent playing surface, the mechanical support mechanism 804 would be properly configured so that the light-emitting boundary definition mechanism 801 may light the surface from below, and the scanning mechanism 802 may scan from below. If the scanning device 800 hangs from the ceiling, or is supported by a wall, the appropriate configuration of mechanical support mechanism 804 may be provided. Accordingly, the specific example configurations of FIGS. 9 and 10A and 10B are only examples of one of an infinite variety of ways to configure the scanning system in the context of a game. Mirrors or lenses may even be used to direct the flow of light for the light-emitting boundary definition mechanism 801 and/or for the scanning mechanism 802.

As previously mentioned, the scanning device 800 may be incorporated into any of the central display 101 (if present) or any of the surrounding game input device 102 without restriction. The scanning device 800 may even be incorporated into a pair of glasses, a hat, an eyepiece or other mechanisms that sits on the player's head. In that case, no light-emitting boundary definition mechanism 801 may be needed, although it still might be helpful. Rather, the player would know that the scanning mechanism 802 is scanning a region that is relative to the player's field of view. The light-emitting boundary definition mechanism 801 might still be helpful though to help the player see the area that is to be scanned since the positioning of the glasses or other headgear, the orientation of the eyeball, and so forth might affect whether the game input region is directly in the player's field of view.

In one embodiment, the processor(s) 805 and the memory 806 may collaborate to determine, at any given point, which players turn it is. The processor(s) and the memory 806 may then cause the light-emitting boundary definition mechanism 801 to provide visual emphasis to the game input region in which physical game input is expected. For instance, the boundaries of the region may be turned green when physical game input is expected.

FIG. 9 illustrates one embodiment 900 of the scanning game input device 800 of FIG. 8. In this embodiment, the scanning game input device has a light-emitting boundary definition mechanism that defines four game input regions 902A, 902B, 902C and 902D. In this embodiment, each game input region is defined by a dedicated light-emitting boundary definition mechanism 801 positioned within an upper portion 903 that is supported by base 901. The light-emitting boundary definition mechanism 801 may be, for example, a Light Emitting Diode (LED), or any other device capable of defining the game input region by providing visual emphasis to the boundaries of the game input region, and/or by providing visual emphasis over the area of the game input region.

While the light-emitting boundary definition mechanism 801 may defined fixed-sized boundaries, the light-emitting boundary definition mechanism 801 may also perhaps be adjustable. For example, the light-emitting boundary definition mechanism 801 may be an array of LEDs. The size and shape of the boundary may be adjusted by turning some of the LEDs off, and keep some on. Each of the LEDs may be mapped to a particular memory location that turns the LED on or off, or adjusted between two discrete intensity levels (in the case of being mapped to a single bit), or have more refined adjustable intensity (in the case of being mapped to multiple bits). As previously mentioned, the boundaries may be overlapping if desired. Such overlapping may also be a reward for a winning player, and a detriment for a losing player, with the winning player perhaps capturing some benefit by the physical game input of the losing player.

The boundary size might be configurable by a user. For instance, a player may choose to have a smaller or larger game input region depending on the player's preference. For instance, a younger player in a dice game might choose to have a larger roll area to accommodate a more aggressive and less controlled roll. An order player might require less of a roll area. The boundary size might also be adjusted by the game state itself. For instance, as a player is losing a game, the player may have a more and more reduced size of a boundary in which to provide physical game input, or perhaps the boundaries may take a particular form that serves to taunt the player that is moving towards a loss. If the player is winning a game, the boundaries may, perhaps, expand, and/or take a more congratulatory form. The LEDs may be of different colors such that the boundaries make a different color depending on game state. For instance, greener game input regions might designate the player is winning, whereas redder game input regions might designate the player is losing. Thus, the players can quickly ascertain and have feedback on how the player is doing. Changing of colors of the game input regions may be accomplished by adjusting the proportion of LEDs of particular colors that are turned on and off, and their respective intensity levels. The color of the game input regions may also define whose turn it is. For instance, if the color is green, that may mean it is that player's turn, if red or off, it may mean it is not that player's turn.

Additionally, the scanning device 800 may be an LED array that directly displays the game input region. For instance, the light-emitting boundary definition mechanism may essentially be a portion of the public display area 211 of the display 200 of the central display 101. Alternatively or in addition, the light-emitting boundary definition mechanism 801 may be all or a portion of the private display area 601 of the player console 600. The light-emitting boundary definition mechanism 801 may also be a laser that defines a sharp boundary for the game input region.

For instance, when it is the player's turn, a window might pop up on a portion of the public display area 211 that is closer to the player. A scanning device might be positioned in a predetermined location (e.g., integrated with the display 200) with respect to that window such that the scanning mechanism 802 may capture the window. The window may include boundaries that make it easier for the scanning mechanism 802 to recognize the boundaries of the game input region. The content of the window may display a good contrasting color to the color of the game input so as to optimize scanning accuracy (e.g., if the die are white, then the window may have darker content. Then the player provides physical game input directly on the public display area (e.g., rolls the dice onto the public display area 211) such that the physical game input that occurs within the window is captured by the scanning mechanism 802. The shape or size of the window may be adjusted in response to game state.

Alternatively or in addition, when it is the player's turn, a window might pop up on a portion of the private display area 601 corresponding to the player console 600 that belongs to the player whose turn it is. Alternatively, there might just be some indicator on the private display area 601 that instructs the player that the private display area 601 is now acting as a game input region. A scanner might be positioned in a predetermined location (e.g., integrated with the player console 200) with respect to that game input region such that the scanning mechanism 802 may capture the window. Then, the player provides physical game input directly on the private display area 601 (e.g., rolls the dice onto the private display area 601) such that the physical game input that occurs within the window is captured by the scanning mechanism 802 associated with the player console. In one embodiment, should the player's game input region reduce in size, a different color may be used to represent the game input region itself, as compared to the portions that could be in the game input region had the player done better. Thus, in this case, the scanning device 800 includes a light-emitting boundary definition mechanism 801 that is a portion of a display itself. Thus, the term "light-emitting boundary definition mechanism" should be interpreted broadly in the claims.

Figure 15:
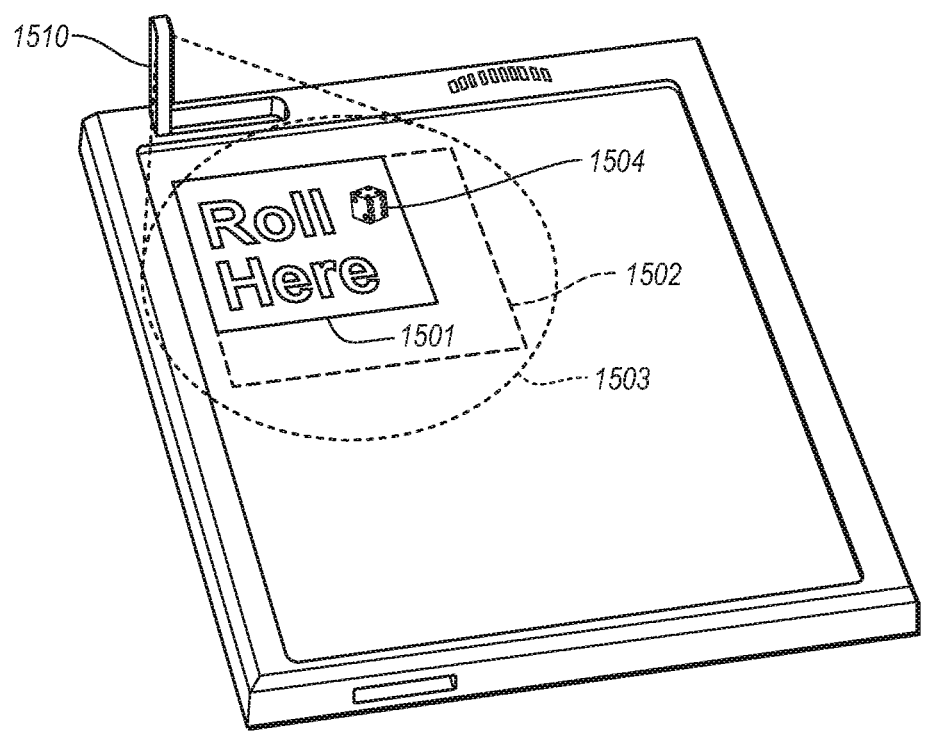
FIG. 15 illustrates a player console with an integrated scanning device that scans a game input region in the form of a window defined on the private display area of the player console itself.

FIG. 15 a player console 1500 with an integrated scanning device 1510 that scans a game input region in the form of a window defined on the private display area of the player console itself. For instance, window 1501 might define a game input region in which the player is to enter physical input (e.g., the roll of a die 1504). The window size might change to be, for example, window 1502 depending on game state. The window may be, for example, a window displayed by an operating system on the private display. The integrated scanning device 1510 may be capable of scanning area 1503, although the system may ignore material scanned outside of the window that defines the game input region. The window may be displayed to have a clear and distinct boundary to make it easier for the integrated scanning device 1510 (or the system that interprets the scanned information to detect the game input region).

Each game input region also has a 3D scanner associated therewith for scanning the region within the corresponding boundary. Thus, there may be four light-emitting boundary definition mechanisms 801 and four 3D scanners present within the scanning game input device. In one embodiment, there may be more of each, but with pairs of light-emitting boundary definition mechanism and corresponding scanning mechanisms being selectively turned off.

FIGS. 10A and 10B collectively illustrated another alternative embodiment of the scanning game input device 800 of FIG. 8. The scanning game input device of FIGS. 10A and 10B appears the same as the scanning game input device 900 of FIG. 9. However, in this embodiment, the upper portion 903 is rotatably mounted to the base 901. The upper portion 903 may have as few as a single light-emitting boundary definition mechanism and single scanning mechanism affixed therein.

The scanning game input device of FIGS. 10A and 10B rotates the upper portion 903' when transitioning turns. This might be done according to some predetermined pattern, with the players situating themselves to be proximate their corresponding desired game input region. On the other hand, rather than being in accordance with a predetermined pattern, the scanning game input device may first determine whose turn it is next, which may not be according to a predetermined pattern. The scanning game input device may determine this autonomously, or may determine this in communication with the central display and/or one or more of the player consoles.

FIG. 10A illustrates the scanning game input device with the rotatable upper portion 903' rotatably mounted on the base 901', and with the boundary definition mechanism and scanning mechanism rotated to form game input region 902A'. In FIG. 10B, the upper portion 903' is rotated to form game input region 902B'. In an alternative embodiment, there may be multiple fixed light-emitting boundary definition mechanisms, whereas a rotatable portion includes the scanning mechanism, which rotates to whichever game input region corresponds to the player set whose turn it is.

In that embodiment, perhaps there is some visual distinction (e.g. boundary color, or intensity level, that gives visual emphasis to the boundaries or area corresponding to the game input region whose turn it is.

In one embodiment, the scanning mechanism rotates not to any fixed position, but senses where the player is whose turn it is presently. For instance, the scanning game input device may detect the position of the player's player console, and rotate the game input region accordingly by rotating the light-emitting boundary definition mechanism and scanning mechanism. The position of the player console may be determined in a number of ways. For instance, the player console may emit ultrasonic or subsonic acoustic signals that the scanning device 800 may acoustically sense. Should GPS coordinate systems become more accurate, the player console may transmit GPS information to the scanning device 800. The position of the player may also be calculated based on the orientation of a camera built into the central display. Thus, if a player moves during the course of the game, the position of their corresponding game input region changes accordingly.

The scanning device 800 might scan any number of physical game input types. For instance, the scanning device 800 might scan dice, playing pieces, playing cards, spinners, or any other object, even the player himself or herself. For instance, the scanning device 800 might scan a human hand. This might allow the game state to reflect that the player played a "rock," or a "paper," or a "scissors", or even "ambiguous." The scanning device 800 might also scan the hand to identify a number of fingers, or whether the hand is facing up or down, and so forth. The scanning device 800 might use a hand as input to allow people proficient in sign language to enter letters or words into the game system.

The scanning device 800 might also scan a human face perhaps to analyze the configuration of the face. For instance, the scanning device 800 may detect whether the face is smiling or is confident, seems angry, frustrated, or nervous, for purposes of making any inference about the players emotions. Such emotional feedback may impact game state. For instance, if the player looks nervous, the player may be more subjected to attack by computerized players, or may have a reduced size of a game input region.

In one embodiment, a game input device 200 may sense other biometrics of a player such as, for example, oxygen levels in the blood, blink rate, perspiration levels, heart rate, breathing rate, chemical content of exhaled breath, blood pressure, and so forth using any appropriate mechanism, whether through scanning device 800 or by some other mechanism. Any one or more of the measured biometrics, either singly, or in combination, may be used to calculate an effect on game state.

A game input device 200 might also be a scanner positioned to view all or a portion of a playing board (e.g., the central display 101 or even a non-electronic playing board or surface), and recognize the position, orientation of a game piece with respect to the playing board, or even a type of game piece. Such information may be used to affect the game state.

Such as scanner may also be able to detect whose game piece or game input device belongs to which player. For instance, die for one player may have a certain marker, such as an indented piece with a certain color. Playing cards may have a miniature bar code distinguishing who the cards belong to. A bar code or other marker might also represent other information regarding a playing piece, such as a type of playing piece, the significance of the playing piece, and so forth. Such scanners need not necessarily have the light-emitting boundary definition mechanism if the players intuitively understand where to play the game pieces in a more common area (e.g., on the central display 101).

Alternatively or in addition, the game input device 200 might emit images or other visual cues on the playing surface in response to game input. For instance, if the player were to roll a six, then the game input device may emit on the playing surface a cue telling the user where to move, or what the options are for moving. The scanning device 800 has been described as potentially having a scanning mechanism 802 that uses light as the scanning signal. However, the scanning mechanism 802 might rather use any signal for scanning such as acoustic signals or safe frequencies of electro-magnetic radiation. An example of electro-magnetic radiation is visible light, ultraviolet light, infrared light, long-wave and short-wave radio, and so forth. The scanning device 800 may use combinations of the above to formulate a more complete scanned image of the game input token. The scanning device 800 might also have any number of different image capture mechanisms. Examples of image capture mechanism include a CCD camera, a bar code scanner, or a 3D imaging camera.

Figure 12:
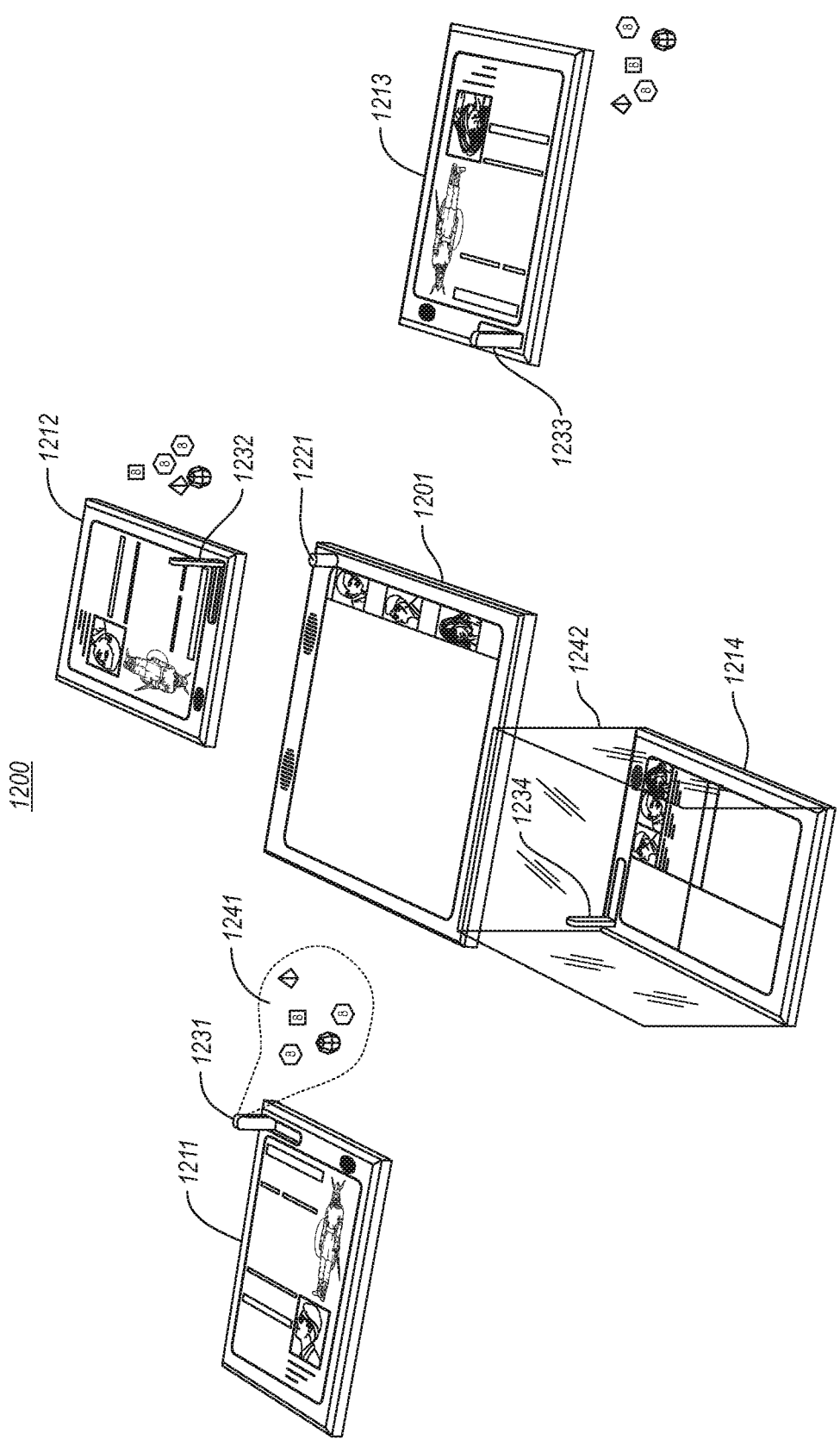
FIG. 12 illustrates an example system with a central display and surrounding player consoles in which each of the central display and the surrounding player consoles has an integrated scanning device.

FIG. 12 illustrates an example system 1200 in which there is a central display 1201 (representing an example of the central display 101 of FIG. 1), and four surrounding player consoles 1211, 1212, 1213 and 1214 (each representing an example of the player console 500 of FIG. 5). The central display 1201 has a rotating camera 1221 that may turn to whomever's turn it is, and capture the player's image for display on the central display 1201 and/or one or more or all of the player consoles 1211 through 1214.

Each player console 1211 through 1214 is shown equipped with an integrated scanning device 1231 through 1234, respectively. The scanning device 1231 represents an example of the scanning device 800 of FIG. 8. A light-emitting boundary definition mechanism associated with the scanning device 1231 is emitting light to define a game input region 1241. In this case, die have been rolled into the game input region 1241. The scanning device 1231 captures the 3D image of the die, and transmits information to the central display 1201 where the roll is incorporated into the game state. One of the player consoles 1214 is shown having a privacy screen 1242, which may be removably attached to the player console 1214, or perhaps may be removably attached to any of the player consoles 1211 through 1214 to provide appropriate privacy.

As an alternative embodiment, the scanning device 1231 might be turned to focus on the display of the player console 1211. When it is the player's turn, perhaps a software-driven window pops up on the display of the player console 1211 showing the player where the player should roll. The player thus would roll the die directly on the display of the player console 1211, whereupon the scanning device 1231 would capture the physical game input for incorporation into the game state.

Figure 13:
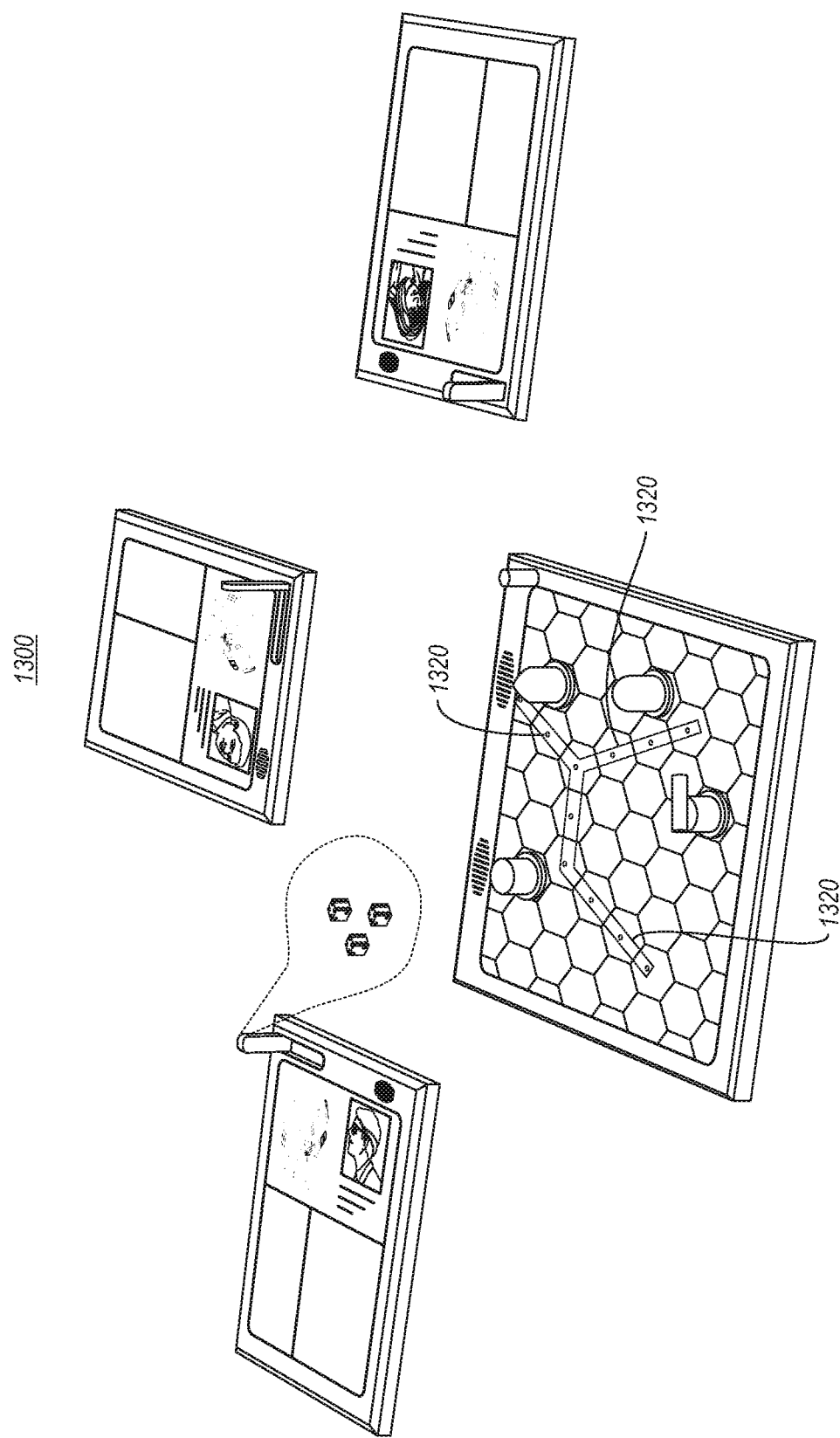
FIG. 13 illustrates an example system with a central display and with surrounding player consoles that each have an integrated scanning device, and with game state responding to physical game input in the form of a die roll.

FIG. 13 illustrates another example system 1300 in which there is a central display 1301 (representing an example of the central display 101 of FIG. 1), and three surrounding player consoles 1311, 1312 and 1313 (each representing an example of the player console 500 of FIG. 5). Here, the game state captured by the physical game input captured by the scanning device is incorporated to actually give the player a visual cue 1320 of the available movement options.

Figure 14:
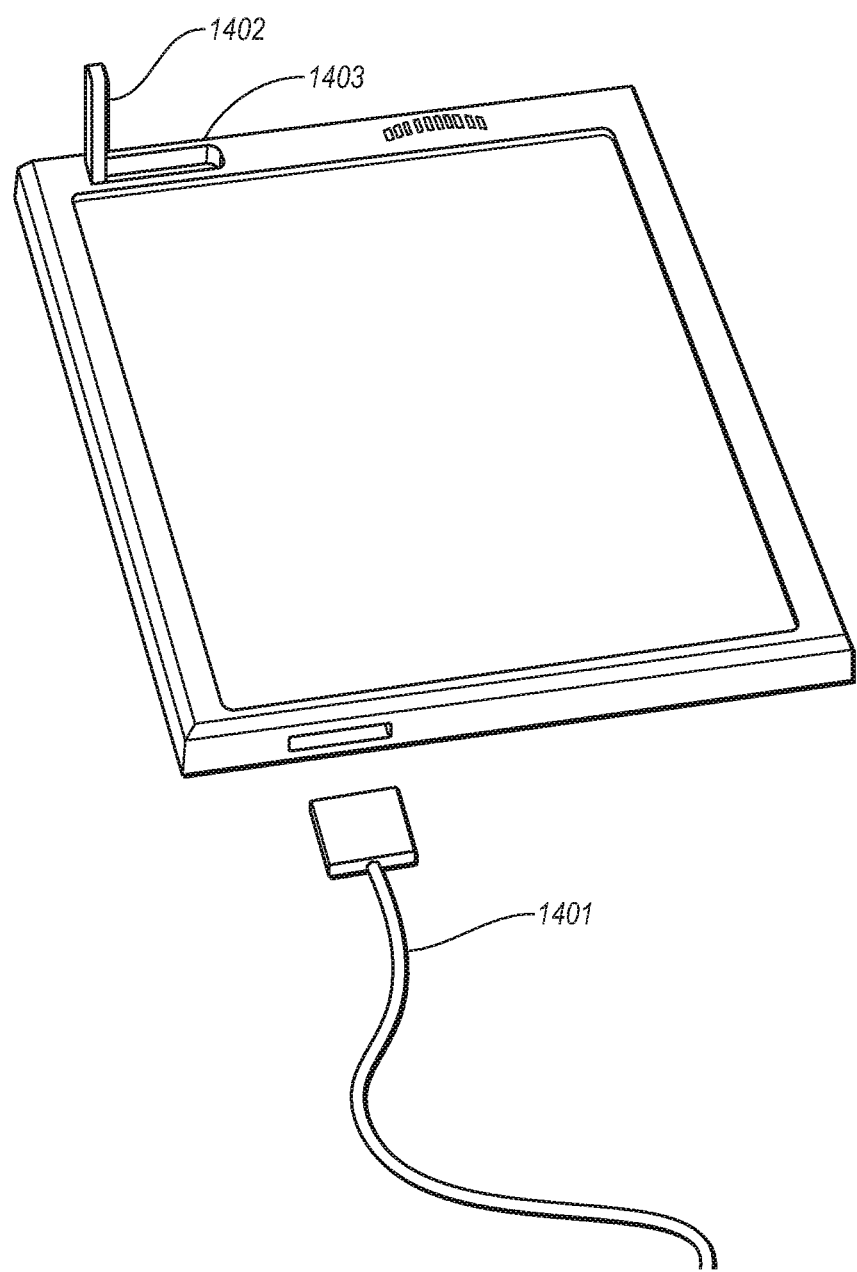
FIG. 14 illustrates a player console with integrated scanning device that represents a closer view of the player consoles illustrated in FIGS. 12 and 13.

FIG. 14 illustrates a player console 1400 that is similar to the player consoles 1211, 1212, 1213, 1214, 1311, 1312 and 1313, except more close up. Here, a scanning device 1402 is shown extended, but with a recess 1403 in which the scanning device 1402 might contract into perhaps before or after the game. In one embodiment, the scanning device 1402 might automatically extend and contract depending on the game state. For instance, if it is the player's turn, then the player console 1400 may extend in preparation for the player providing game input. In an alternative embodiment, the scanning device 1402 remains extended for the duration of the game, and may be manually extendable and contractible. A data and/or power cable 1401 (such as a USB cable) is also shown demonstrating that the player console may integrate with existing data cables and power cables.

Thus, a sophisticated mechanism is described for inputting physical input into game state. The distributed game system described herein thus allows circle games to be played electronically. Traditionally, it is often teenagers that lose interest in circle games. The wireless distributed game system appeals to a teenager's keenness for a sense of technology, which has the potential to pull teenagers back into the family circle games, potentially enriching family relationships and maintaining important lines of communication.

In one embodiment, the central display 101 has an Internet connection (represented generally by the ellipses 127 in FIG. 1. During initial power-up of the central display, the central display may be configured to navigate to a predetermined set of one or more web sites, and may have a predetermined set of circle games installed already. The player might use the central display to navigate to a central web site that may be used to download software necessary to engage in other circle games. When a circle game is begun, the central device may inform the surrounding player consoles of the game that is about to begin and, if necessary, provide the appropriate software to the player consoles as well. In one embodiment, the player consoles are general-purpose computing devices with one or more processors, a memory, and potentially a hard disk.

Accordingly, a flexible game system has just been described. Having described the embodiments in some detail, as a side-note, the various operations and structures described herein may, but need not, be implemented by way of a physical computing system. Accordingly, to conclude this description, an example computing system will be described with respect to FIG. 11.

Figure 11:
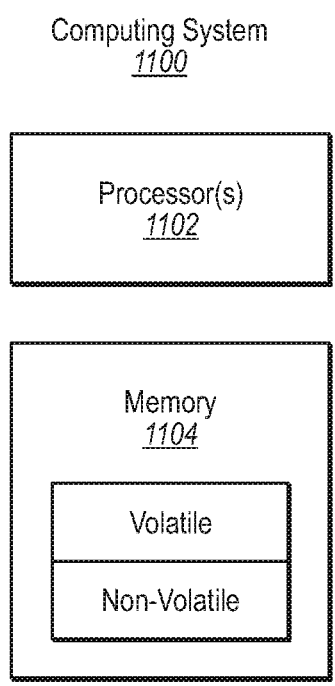
FIG. 11 illustrates a computing system architecture in which the principles described herein may be employed in at least some embodiments.

FIG. 11 illustrates a computing system 1100. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any physical form and may depend on the nature and form of the computing system. A computing system may be distributed over a network environment and may include multiple constituent computing systems.

As illustrated in FIG. 11, in its most basic configuration, a computing system 1100 typically includes at least one processing unit 1102 and memory 1104. The memory 1104 is a physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description above, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 1104 of the computing system 1100.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other physical medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The components of the computing system 1100 may, for example, be used to provide functionality to game logic 112 of FIG. 1, store or remember game state 113, configure and communicate with transceiver 114, and operate the logic of game incorporation mechanism 115. Each of the player consoles may also have a computing system such as computing system 1100 guiding their processing needs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scopes.

What is claimed:

1. A projected display-interactive input mechanism comprising:
    a boundary definition mechanism capable of defining at least one input region over a first side of a display surface laterally coincident with a projected display projected onto the first side of the display surface;

a scanning mechanism capable of scanning an object within a three-dimensional space on the at least one input region within which one or more users may provide physical input to affect a state of the projected display;

an input identification mechanism capable of identifying an input represented by a scanned object in the three-dimensional space and of associating the input with at least one user corresponding to the at least one input region in which the scanned object was scanned; and a communication mechanism capable of communicating information regarding scanned objects scanned by the scanning mechanism.

2. The projected display-interactive input mechanism of claim 1, wherein the boundary definition mechanism is capable of defining a plurality of input regions coincident with the projected display.

3. The projected display-interactive input mechanism of claim 2, wherein each input region of the plurality of input regions corresponds to a single user.

4. The projected display-interactive input mechanism of claim 1, further comprising:
a mechanical support that carries the boundary definition mechanism and the scanning mechanism and that is capable of orienting the boundary definition mechanism and the scanning mechanism toward the display surface.

5. The projected display-interactive input mechanism of claim 4, wherein the mechanical support further carries a projector capable of projecting the projected display onto the display surface.

6. The projected display-interactive input mechanism of claim 1, further comprising:
a user association mechanism capable of associating any scanned object with at least one user corresponding to an input region in which the object was scanned.

7. The projected display-interactive input mechanism of claim 1, wherein the physical input includes introducing a body part of at least one user into the three-dimensional space.

8. The projected display-interactive input mechanism of claim 2, wherein the scanning mechanism is capable of scanning one or more input regions of the plurality of input regions, but fewer than all of the plurality of input regions only when the projected display has a particular interactive state.

9. The projected display-interactive input mechanism of claim 8, wherein the boundary definition mechanism is capable of emitting light to provide visual emphasis to the one or more input regions in the particular interactive state, as compared to one or more other input regions in an inactive state.

10. The projected display-interactive input mechanism of claim 9, wherein the boundary definition mechanism is capable of not emitting light onto the one or more other input regions in the inactive state.

11. The projected display-interactive input mechanism of claim 8, wherein the boundary definition mechanism is capable of selectively moving a boundary for an active input region from one input region of the plurality of input regions to another input region of the plurality of input regions.

12. The projected display-interactive input mechanism of claim 8, wherein the boundary definition mechanism is capable of defining the one or more input regions in the particular interactive state by emitting light over an entirety of the one or more input regions.

13. The projected display-interactive input mechanism of claim 8, wherein the boundary definition mechanism is capable of defining the one or more input regions in the particular interactive state by emitting a laser along a perimeter of the one or more input regions.

14. The projected display-interactive input mechanism of claim 1, wherein the communication mechanism communicates wirelessly.

15. A projected display-interactive input mechanism comprising:
a boundary definition mechanism capable of selectively defining one or more input regions, each of the one or more input regions being a region on and/or adjacent to an opaque display surface onto which a display is projected and which is capable of receiving user input on and/or adjacent to the opaque display surface to affect a state of the display;

a scanning mechanism capable of selectively scanning the one or more input regions to detect objects placed within the one or more input regions;

an input identification mechanism capable of identifying an input represented by a scanned object positioned on or adjacent to the one or more input regions and of associating the input with at least one user corresponding to the one or more input regions on and/or adjacent to which the scanned object was scanned; and a communication mechanism capable of communicating information regarding each scanned object.

16. The projected display-interactive input mechanism of claim 15, further comprising:
a mechanical support that carries the boundary definition mechanism and the scanning mechanism and that is capable of orienting the boundary definition mechanism and the scanning mechanism toward the opaque display surface.

17. The projected display-interactive input mechanism of claim 16, wherein the mechanical support further carries a projector capable of projecting a projected display onto the opaque display surface.

18. A projected display-interactive input mechanism comprising:
a boundary definition mechanism capable of defining at least one input region on a first side of a display surface;

a scanning mechanism capable of selectively scanning at least some objects placed within a three-dimensional space over the at least one input region coincident with a display projected onto the first side of the display surface, in which one or more users may provide physical input to affect a display state;

an input identification mechanism capable of identifying an input represented by a scanned object scanned by the scanning mechanism, and of associating the input with at least one user corresponding to the at least one input region in which the scanned object was scanned; and a communication mechanism capable of communicating information regarding each scanned object scanned by the scanning mechanism, and information regarding an input region the scanned object was scanned in.

19. The projected display-interactive input mechanism of claim 18, further comprising:
a mechanical support that carries the boundary definition mechanism and the scanning mechanism and that is capable of orienting the boundary definition mechanism and the scanning mechanism toward the display surface.

20. The projected display-interactive input mechanism of claim 19, wherein the mechanical support further carries a projector capable of projecting the projected display onto the display surface.

* * * * *